(12) United States Patent
Fu

(10) Patent No.: US 10,587,875 B2
(45) Date of Patent: Mar. 10, 2020

(54) CODING TOOLS FOR SUBJECTIVE QUALITY IMPROVEMENTS IN VIDEO CODECS

(71) Applicant: Intel Corporation, Santa Clara, CA (US)

(72) Inventor: Fangwen Fu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 15/855,824

(22) Filed: Dec. 27, 2017

(65) Prior Publication Data

US 2019/0045185 A1 Feb. 7, 2019

Related U.S. Application Data

(60) Provisional application No. 62/465,581, filed on Mar. 1, 2017.

(51) Int. Cl.
| | |
|---|---|
| *G06K 9/52* | (2006.01) |
| *G06K 9/62* | (2006.01) |
| *H04L 29/06* | (2006.01) |
| *H04N 19/119* | (2014.01) |
| *H04N 19/124* | (2014.01) |
| *H04N 19/117* | (2014.01) |
| *H04N 19/132* | (2014.01) |
| *H04N 19/176* | (2014.01) |
| *H04N 19/159* | (2014.01) |
| *H04N 19/137* | (2014.01) |
| *H04N 19/189* | (2014.01) |
| *H04N 19/70* | (2014.01) |
| *H04N 19/14* | (2014.01) |

(52) U.S. Cl.
CPC ......... *H04N 19/117* (2014.11); *H04N 19/119* (2014.11); *H04N 19/124* (2014.11); *H04N 19/132* (2014.11); *H04N 19/137* (2014.11); *H04N 19/14* (2014.11); *H04N 19/159* (2014.11); *H04N 19/176* (2014.11); *H04N 19/189* (2014.11); *H04N 19/70* (2014.11)

(58) Field of Classification Search
CPC .. H04N 19/172; H04N 19/136; H04N 19/176; H04N 19/33; H04N 19/42; H04N 19/46; H04N 19/52; H04N 19/61; H04N 19/70; H04N 21/23418
See application file for complete search history.

(56) References Cited

U.S. PATENT DOCUMENTS

| | | | |
|---|---|---|---|
| 2017/0064313 A1* | 3/2017 | Wu | H04N 19/33 |
| 2017/0272774 A1* | 9/2017 | Symes | H04N 19/164 |

OTHER PUBLICATIONS

Grange, VP9 Bitstream & Decoding Process Specification, 2016, Google, Version 0.6, entire document (Year: 2016).*

* cited by examiner

*Primary Examiner* — Alison Slater
(74) *Attorney, Agent, or Firm* — Green, Howard & Mughal LLP.

(57) ABSTRACT

Coding tools are described for subjective quality improvements in video codecs. Some embodiments pertain to a method that includes receiving video frames, generating a segmentation map of a received video frame, determining features of a segment of the segmentation map, determining if the segment has a skip or a reference frame feature, and if the segment has one of a skip or a reference frame feature, then classifying the segment as an active segment and attaching an active segment identifier to the segment.

22 Claims, 13 Drawing Sheets

CODING TREE FOR SPATIAL_PREDICTION_IDC

SEGMENT TREE FOR TWO SEGMENTS

SEGMENT TREE FOR FIVE SEGMENTS

NEIGHBOR BLOCKS FOR SEGMENT ID CODING UNIT

CODING TOOLS FOR SUBJECTIVE QUALITY IMPROVEMENTS IN VIDEO CODECS

CROSS-REFERENCE TO RELATED APPLICATIONS

The present application claims priority to U.S. Provisional Application Ser. No. 62/465,581 filed Mar. 1, 2017 entitled "Methods to Enhance the Coding Tools for Subjective Quality Improvement" the disclosure of which is hereby incorporated by reference herein.

FIELD

The present description relates to communication of encoded video and, in particular, to improved coding tools for video encoding and decoding.

BACKGROUND

With the emergence of low cost high definition video cameras and high-speed internet connectivity, video internet traffic is growing quickly. Consumers desire higher resolution video to support larger and higher definition displays. The revolution to high definition 1080p video is being surpassed by commonly available 4K displays and 8K is being rolled out for video capture and display. These higher resolution formats push the need for more efficient and higher quality video codecs.

VP9 is a video codec developed under the auspices of the Alliance for Open Media and is intended to efficiently provide for high definition video streaming and storing with either lossy or lossless compression. AV1 (AOMedia Video 1) is a successor improvement of VP9. HEVC/H.265 developed under the auspices of the Video Coding Experts Group (VCEG) and Moving Pictures Experts Group (MPEG) has some similar features.

BRIEF DESCRIPTION OF THE DRAWING FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity.

DETAILED DESCRIPTION

Figure 1:
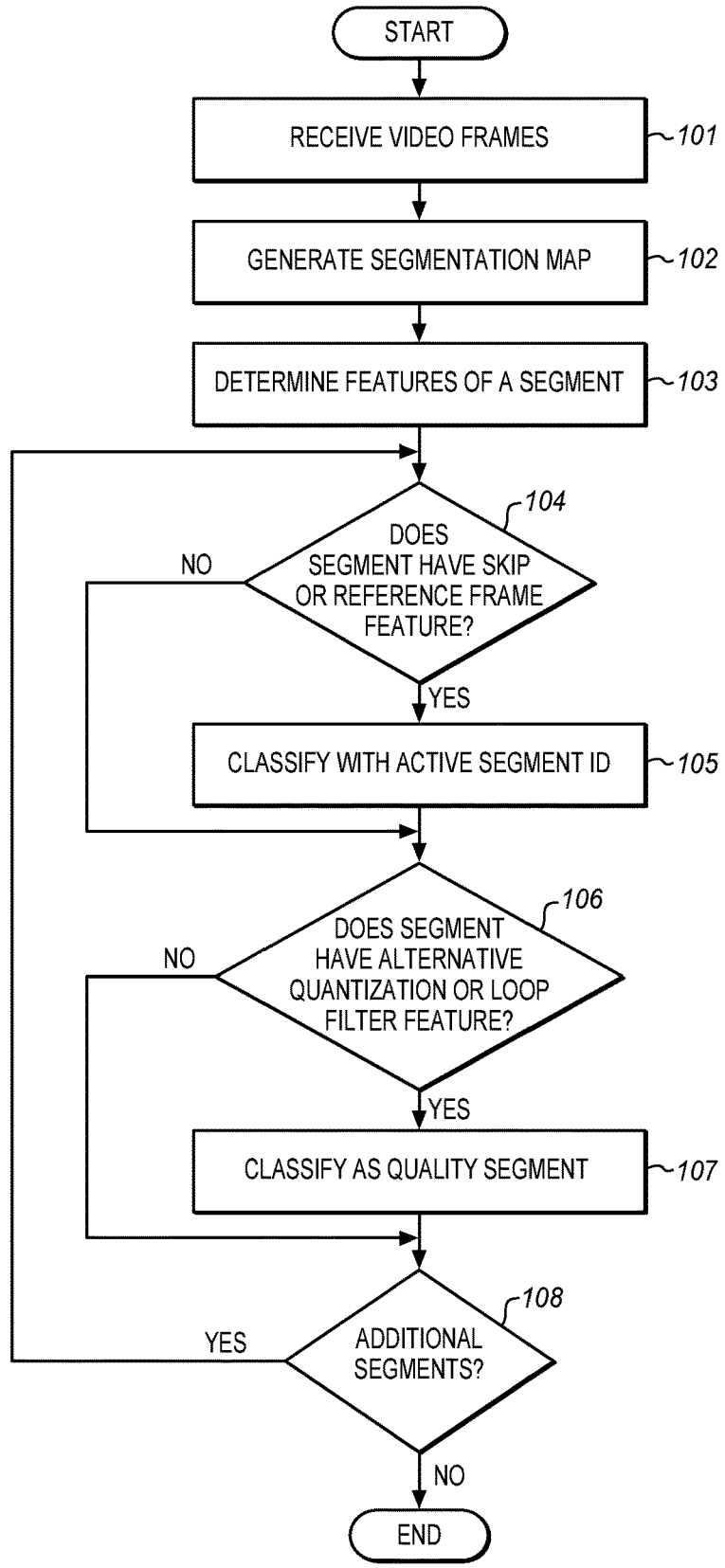
FIG. 1 is a process flow diagram of segment classification according to an embodiment.

The described techniques enhance the existing coding tools used in the VP9 specification and the AV1 (AOM Version 1) specification promulgated by AOM (Alliance for Open Media) for subjective quality improvement (e.g. via QP and loop filtering level modulation at the block level). These enhanced coding tools improve the segment coding efficiency (e.g. in terms of BDRate) and add more flexibility on quantization value and loop filter level modulation. The present description is also related to HEVC/H.265 and all its extensions (HEVC RExt, etc.) and profiles, VP9 and all its extensions and profiles.

VP9 provides for an image or frame to be divided into as many as eight different segments. Each segment may have a different quantizer, loop filter strength, prediction reference frame, and block skip mode. The quantizer is used to scale pixel coefficients when encoding and decoding a block. The loop filter is used in reconstruction of a frame to reduce the visibility of block edges. The prediction reference frame is the previous frame that is used to predict pixels values for the current frame. The block skip mode may imply the use of a zero motion vector and that no residual will be coded. These values may be modified for each frame.

The described techniques have a number of methods that combine to enhance a set of the coding tools in order to improve the coding efficiency and subjective quality. Specifically, the described techniques improve the segment coding tools in the VP9 specification to efficiently code the segment ids, add delta loop filter level signaling at the superblock level to migrate the artifacts due to quantization value change across the superblock, and allow superblock level delta QP/loop filter level signaling to coexist with segment features in order to improve subjective quality.

In VP9, a block is a square or rectangular region of pixels in an image or frame that has one luma and two chroma matrices. A block may be defined in different sizes in different images or frames, such as 8×8 pixels or 32×32 pixels. The block may be partitioned into smaller subblocks. A superblock contains multiple blocks and is defined in VP9 as 64×64 pixels. The superblock may have 4, 16 or some other number of blocks.

The described techniques improve the coding efficiency of segments, and subjective quality by allowing the signaling of the delta QP (Quantization Parameter), delta loop filter level and segments. This improvement applies to implementation of video encoders and video decoders.

In the current VP9 specification, there are four segment features: (1) SKIP feature indicates the block is coded with zero mv (motion vector) and zero coefficients; (2) REF_FRAME (Reference Frame) feature indicates the block is coded with the given reference index; (3) ALT_Q (Alternative Quantization) feature indicates the block is quantized with an alternative quantization index (either absolute q or delta q); (4) ALT_LF (Alternative Loop Filter) feature indicates the block is using the alternative loop filter level (either absolute loop filter level or delta loop filter level).

Within the above four features, the SKIP and REF_FRAME features are often used to indicate which blocks are static (no motion), and ALT_Q and ALT_LF features are often used to improve subjective quality by adjusting the q index and loop filter level per block. Two types of segments are defined herein: active segment which includes SKIP and REF_FRAME features and indicate which parts of the frame are active (i.e. dirty) comparing to previous frames (indexed by reference index) and quality segment which includes ALT_Q and ALT_LF features and is used to improve the subjective quality by varying the q index and loop filter level. In contrast to previous approaches, the active and quality segments will each have their own segment id, named, for convenience in this description, active_segment_id and quality_segment_id, respectively.

The segment_id specifies which segment is associated with a current intra block being decoded. A segment may have one or more blocks as specified by the corresponding segmentation map. A segment id may be indicated as predicted from the segmentation map or not. As an example, in VP9, the parameter seg_id_predicted equal to 1 specifies that the segment_id should be taken from the segmentation map. On the other hand, seg_id predicted equal to 0 specifies that the syntax element segment_id should be parsed.

In the VP9 specification, the segment features are used to control the quantization index or quantizer index and loop filter level per block in order to achieve a subjective quality enhancement when decoding a frame. The segment features are also used to indicate which block is a skip (zero mv (motion vector) and zero coefficients) block and which reference is used. The existing coding methods are not very efficient for the segment ids because: (1) Segment id coding does not explore the spatial correlation when it is not temporally predicted; (2) Segment id is always coded even though the block is skipped; (3) Segment id is always coded at the 8×8 block level even when more than one block has the same segment id; (4) Segmentation map for temporal prediction is always assumed from the previous frame in the encoding order.

The segment map or segmentation map is a number, e.g. a 3-bit number, for each block, e.g. an 8×8 block, that contains the segment affiliation for the respective block in a frame. The segmentation map persists across frames unless a change is explicitly coded. It may include the quantizer, loop filter strength, prediction reference frame and block skip mode for the respective block.

The frame has a specified sequence as shown in Table 1.

TABLE 1

| Frame 0 | | | |
|---|---|---|---|
| Uncompressed Header | Compressed Header | Tile 0 | Tile 1 |

The first bytes contain the uncompressed header. This contains almost all the frame level information using raw binary encodings (i.e. no arithmetic coding). The compressed header follows the uncompressed header and specifies the transform size to use during the frame plus information about which probabilities to adjust. The information in this second header is compressed using arithmetic coding.

The headers are followed by the bytes for each tile in turn. Each tile contains the tile size (omitted for the final tile) followed by the arithmetic coded data for the tile.

This structure is used for normal frames. There are also short frames that simply contain 1 byte of uncompressed header (or 2 for profile 3) that indicate that the decoder should show a previously decoded frame. These short frames have no compressed header and no tile data.

In low delay applications, it is often required that the frame size of each frame does not deviate too much (e.g. less than 5-10%) due to the smaller output buffer and tighter latency requirement. However, the segment features may not be able to achieve such a low frame size deviation goal. It has been proposed to add delta q signaling at the superblock level to allow the rate control algorithm to change the quantizer value per superblock for subframe rate control. However, this proposal has several limitations.

First, the delta q signaling does not work together with segment features. As segment features are useful to improve the subjective quality, segment features also improve low delay applications.

Second, in VP9, the loop filter level is separately signaled in the uncompressed header. The loop filter level value has high correlation with the quantizer values. The delta q signaling proposal only allows the quantizer value to change per superblock, but not the loop filter level. It is highly desired to adapt the loop filter level as well together with the quantizer value.

The described techniques enhance the coding tools to address the above limitations, among others, in order to improve subjective quality. Segment id coding may be improved, inter alia, as follows: (1) Define two types of segments: active segments and quality segments, each of which has its own segment id; (2) Explore the spatial correlation in the segment id and build context based spatial prediction coding on the segment id when temporal prediction is used; (3) Bypass segment id coding for quality segments when the block is skipped (zero coefficients); (4) Signal a minimum segment id unit at an uncompressed header to allow the segment id to be coded at the pre-defined granularity (instead of an 8×8 level); (5) Segmentation map for temporal prediction is always from the frame in ref 0 (i.e. LAST REFERENCE).

The signaling of delta QP and loop filter level may be improved, inter alia, as follows: (1) Add support for delta loop filter level at the superblock to improve the loop filtering to migrate the artifact due to the change of quantization value across superblocks; (2) Allow the signaling of delta QP and loop filter level to work with segments. In this way, segment coding tool may be used to improve the subjective quality while delta QP signaling is used to achieve the target frame size in the low delay application.

As mentioned above segment features may be classified as active segments and quality segments. These may be assigned a respective segment id such as active_segment_id and quality_segment_id.

This segment classification is shown in FIG. 1 as a process flow diagram. The process may be performed at a decoder coupled to a camera, mass storage device, communications interface or other suitable video source. At 101, the video is received at the decoder or a part thereof. The video is received as a sequence of video frames and may be encoded and then decoded in any of a variety of different formats. At 102 a segmentation map is generated for a first one of the frames in the video sequence. The segmentation map identified multiple segments in the frame.

At 103 features of a first one of the segments are determined. At 104, it is determined whether the segment has a skip or reference frame feature. If so then it is classified as an active segment and associated with an active segment id at 105. The process continues to determine whether the segment has an alternative quantization or alternative loop filter feature at 106. If it has either one or both of these features then the segment is classified as a quality segment and associated in the segmentation map with a quality segment id. The process continues to determine whether there are any additional segments in the segmentation map for this or any subsequent frames at 108. If there are additional segments then the process returns to 103 to classify the next segment. After the segments are classified, the process ends.

In some embodiments, the active segment and quality segment may be independently enabled and independently disabled. One block may have both an active_segment_id (if enabled) and a quality_segment_id (if enabled) at the same time. This is similar to how arbitrary feature combination (within each type of segment or crossing segment types) is allowed in the Av1 specification.

In this example, the maximum number of active segments is restricted to four although the techniques described herein are flexible to support much larger numbers. For higher quality in this example, the maximum number of quality segments is increased to sixteen as compared to the eight quality segments in Av1 (including all features). For subjective quality improvements, the increase in the maximum number of quality segments may be used to provide finer granularity control on the q index and loop filter level. Different numbers of active segments and quality segments may be used to suit different implementations.

As mentioned above, the coding efficiency may be further improved by using spatial prediction as a possible alternative to temporal prediction. This may be correlated with the segment id. This may be applied both to the active segment and to the quality segment.

In an Intra coded frame (a spatial prediction frame predicted using sample values from the same frame), the segment id coding may be as follows.

First, the spatial context is derived to 1 if all of the following conditions are true: (a) Left block is available; (b) Top block is available; and (c) Segment id in the left block is equal to the segment id in the top block.

If any one of the above conditions are not true then the spatial context is derived to 0.

The spatial prediction (spatial_prediction_idc) of the segment id of the current block is coded using the tree described below with respect to FIG. 2. The probabilities used to code the spatial_prediction_idc depend on the context derived from neighbor blocks.

If the spatial prediction_idc is SEG_ID_COPY_LEFT, the segment id is copied from the left block; otherwise, if spatial_prediction_idc is SEG_ID_COPY_ABOVE, the segment id is copied from the above block; otherwise, (i.e. spatial_prediction_idc is SEG_ID_SPATIAL_UNPREDICTED), a segment tree is used to code the segment id value explicitly.

Figure 2:
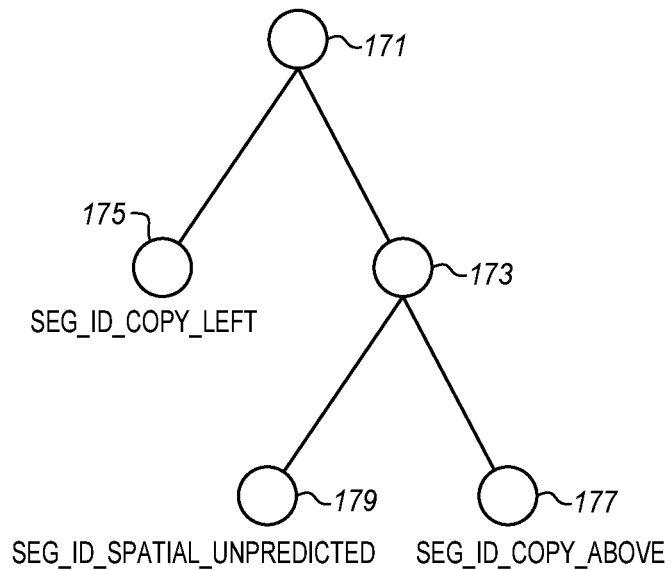
FIG. 2 is a tree diagram of a segment tree for implementing spatial prediction according to an embodiment.

FIG. 2 is a tree diagram of a segment tree for implementing spatial prediction according to an embodiment. The tree has a current block with a root segment id 171. There is a first branch to a copy left command 175, e.g. SEG_ID_COPY_LEFT, for which the current block values are then copied from the segment to the left. There is a second branch 173 which may lead to a copy above command 177, e.g. SEG_ID_COPY_ABOVE, for which the current block is copied from the segment above the current block. Alternatively, the second branch may lead to an explicit segment coding command 179, e.g. SEG_ID_SPATIAL_UNPREDICTED, for which the current block is not generated with spatial prediction but is explicitly coded.

Figure 3:
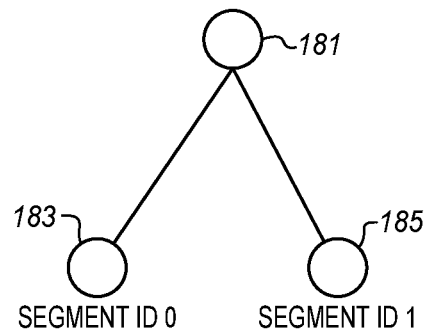
FIG. 3 is a tree diagram of a segment tree for implementing spatial prediction according to another embodiment.

The segment tree may be built depending on the number of segments in the given segment category. For example, if there are only two segments in an active or quality segment, the segment tree may be designed as shown in FIG. 3. FIG. 3 is an example tree diagram for two segments. In this case the current block 181 branches into a first segment 183, e.g. segment id 0, and a second segment 185, e.g. segment id 1.

Figure 4:
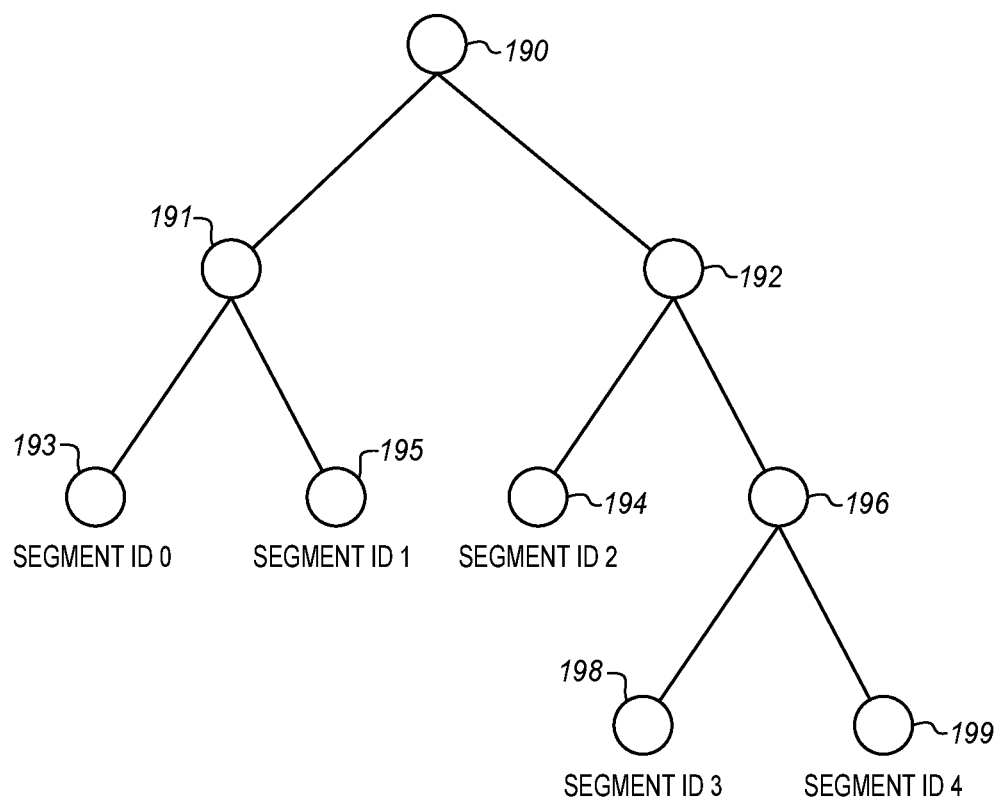
FIG. 4 is a tree diagram of a segment tree for implementing spatial prediction according to another embodiment.

If there are 5 segments, for example, in an active or quality segment, the segment tree may be designed as shown in FIG. 4. FIG. 4 is an example tree diagram for five segments. The current block 190 is indicated at the root node. This may branch in two directions 191, 192, The first branch 191 branches out into two segments 193, 195 indicated as segment id 0, segment id 1. The second branch branches into a third segment 194, indicated as segment id 2, and into a second node 196. This second node branches into two more segments 198, 199, indicated as segment id 3 and segment id 4. The particular configuration of the tree may vary with different superblocks and different frames and there may be more or fewer segments and more or fewer blocks. The tree diagrams of FIGS. 1, 2, and 3 are provided only as examples.

Figure 5:
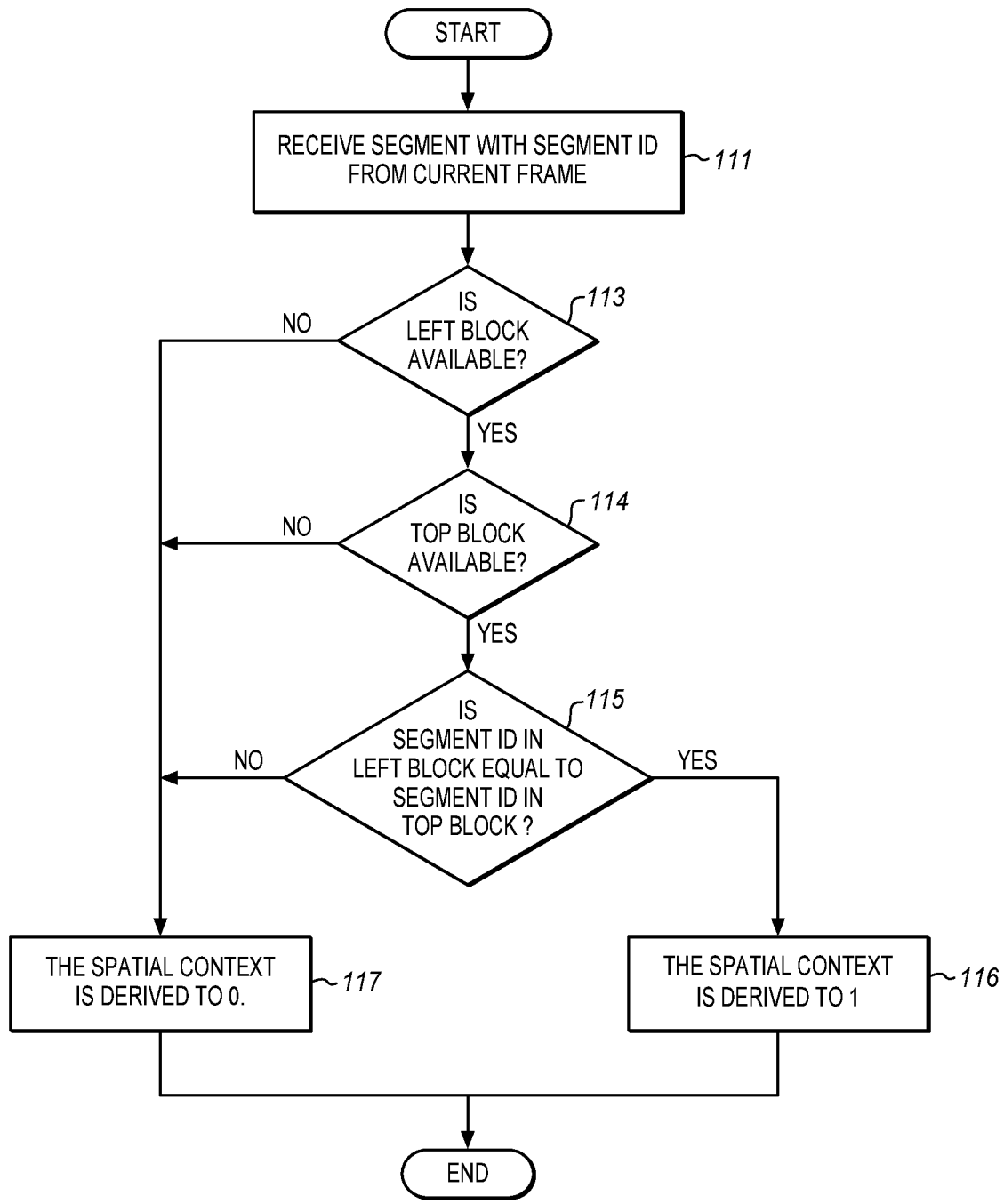
FIG. 5 is a process flow diagram of segment id spatial prediction according to an embodiment.

FIG. 5 is a process flow diagram of applying spatial prediction to a segment id. The same process may be applied to active segments and quality segments. The process starts and at 111 a segment with a segment id is received for a current frame that is being encoded. As described above, the spatial context is derived to 1 at 116 if several conditions are true. If any one of the conditions is not true, then the spatial context is derived to 0 at 117. The conditions are provided in the three decision blocks. Block 113 determines whether the left block is available. Block 114 determines whether the top block is available. Block 115 determines whether the segment id in the left block of the current frame is equal to the segment id in the top block of the same current frame.

In an Inter coded frame (a frame predicted using sample values from a previous frame) the segment id coding may be different from that described above for an Intra coded frame.

An update flag may be used for temporal prediction for each segment. As an example, if a seg_id_temporal update flag (segment id temporal update flag) in the uncompressed header is equal to 1, a temporal prediction flag (temp_pred) may be coded. If the temporal prediction flag is equal to 1, the segment id may be copied from the segmentation map in the previous frame (i.e. the first reference in reference list). Otherwise, if the temporal update flag is equal to 0, the segment id is coded the same as in the intra coded frame.

When symbol based arithmetic coding is employed, the temp_pred and spatial_pred_idc can be merged into one symbol during the arithmetic coding which will improve arithmetic coding throughput.

As mentioned above, if segment features in the quality segment do not have any impact on the final reconstructed pixels, then the segment id coding may be by-passed for a quality segment. If a block is coded as skip (zero coefficients), then the base quantization index (base_q_idx) does not impact the final reconstructed pixels. Furthermore, if the block is coded as inter, the loop filter level also will not impact the final reconstructed pixels. Segment id coding efficiency, may be improved simply by by-passing the quality segment id coding. This saves time required to code the segment id and reduces the amount of data transmitted by not sending a segment id.

After the segments are classified into two categories, the active segments are coded. In some embodiments, the active segments will be always coded if presented (using temporal or spatial prediction if possible). However, quality segment id coding may be skipped in some cases.

The following set of rules or principles may be used to determine whether to by-pass quality segment id coding.

First, if the block is intra coded, and if ALT_LF feature is not enabled in the quality segment and if the block is coded SKIP (zero coefficients), then the quality segment id for this block is by-passed; otherwise, the segment id is explicitly coded (using temporal, spatial prediction if possible).

Second, if the block is inter coded, and if the block is coded as SKIP (zero coefficients), then the quality segment id for this block is by-passed; otherwise, the segment id is explicitly coded (using temporal, spatial prediction if possible).

Third, when a minimum segment id unit size is above 8×8, the segment id will be only coded for the first block within the minimum segment id unit that is not skipped. If all the blocks within the minimum segment id units are all skipped, the segment id for this minimum segment id unit is by-passed. This adaptation is suitable for any situation in which the block is a particular size, which may be 8×8 or another size, and the segment id unit is a larger size. In this case the blocks of the segment id unit will all have the same segment id and only one needs to be coded. The segment id for the rest of the blocks within the segment id unit will be same as for the one that is coded. Accordingly, they may be bypassed.

Figure 6:
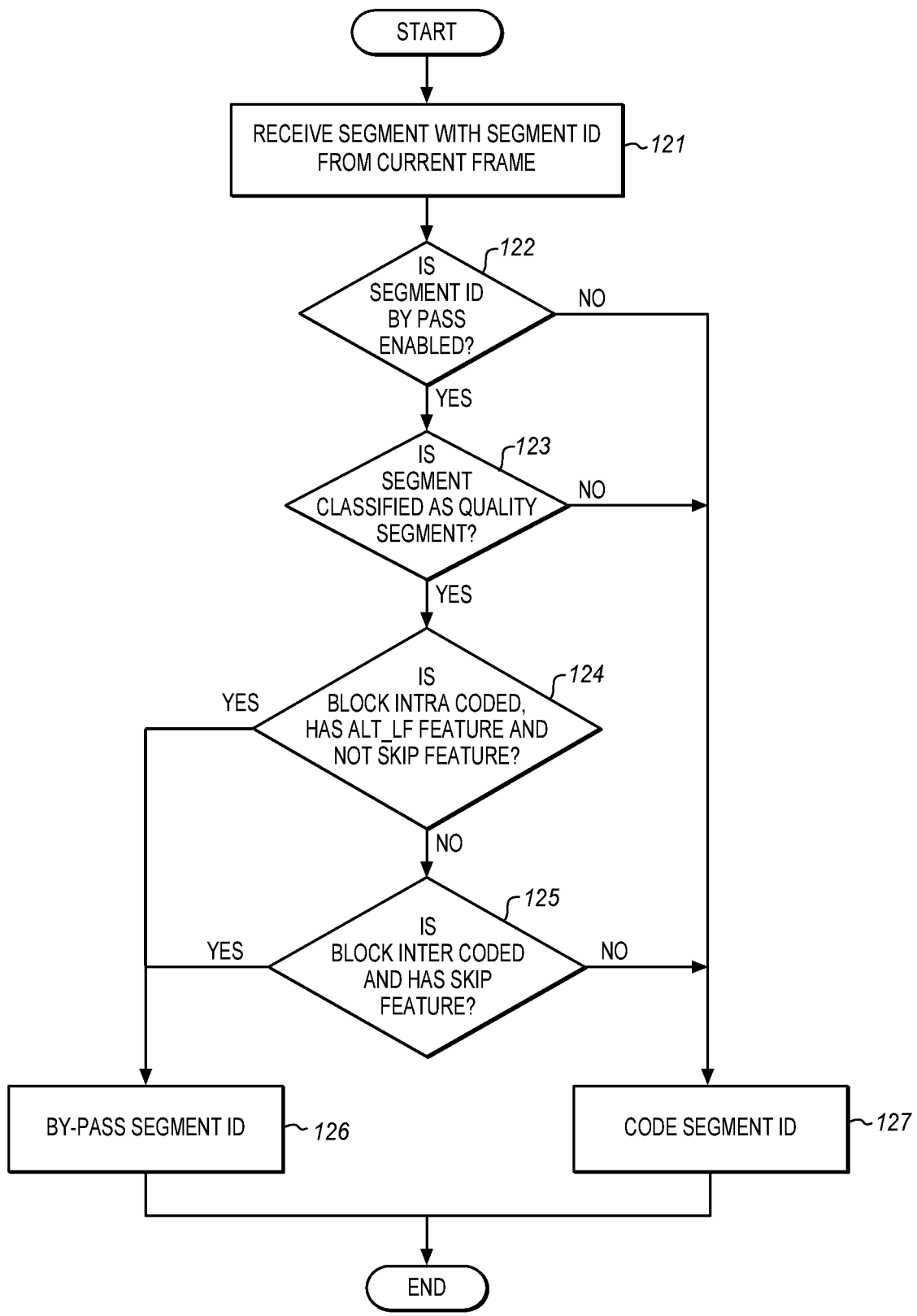
FIG. 6 is a process flow diagram of by-passing segment id coding for some segments according to an embodiment.

FIG. 6 is a process flow diagram for by-passing segment id coding as described above. First a segment and segment id are received from the current frame at 121. At 122 if segment id is by pass enabled, then the process continues to 123. If not then the process goes to 127 to code the segment id. At 123, there is a check to determine whether the segment is classified as a quality segment. If not, then the process goes to 127 to code the segment id. If it is, then any of a sequence of tests may be applied to determine whether the segment id may be by-passed. As mentioned above, in some cases, the segment may be classified as both an active segment and a quality segment. In some cases, the segment id may be by-passed for quality segments when the segment is also an active segment. In such a case, the active segment features SKIP and REF_FRAME are tested as shown at 124, 125.

In this example, the first test 124 is whether the relevant block is intra coded, has an ALT_LF feature and does not have a SKIP feature. If so, then 126 the segment id is by-passed. If not then an additional may be performed. One such test at 125 is whether the block is inter coded and has a SKIP feature. If so, then at 126 the segment id is by-passed. If not, then additional tests may be applied including the third test above regarding whether the minimum segment id size is larger than the block size. If none of the tests are passed, then at 127 the segment id is coded.

The block referred to in FIG. 6 is a block that has the segment id. If the segment id unit size is larger than a single block then the operations may be repeated for each of the blocks of the segment id. However, in such a case, typically all but one of the segment ids may be by-passed for such a segment id unit size as described above.

Figure 7:
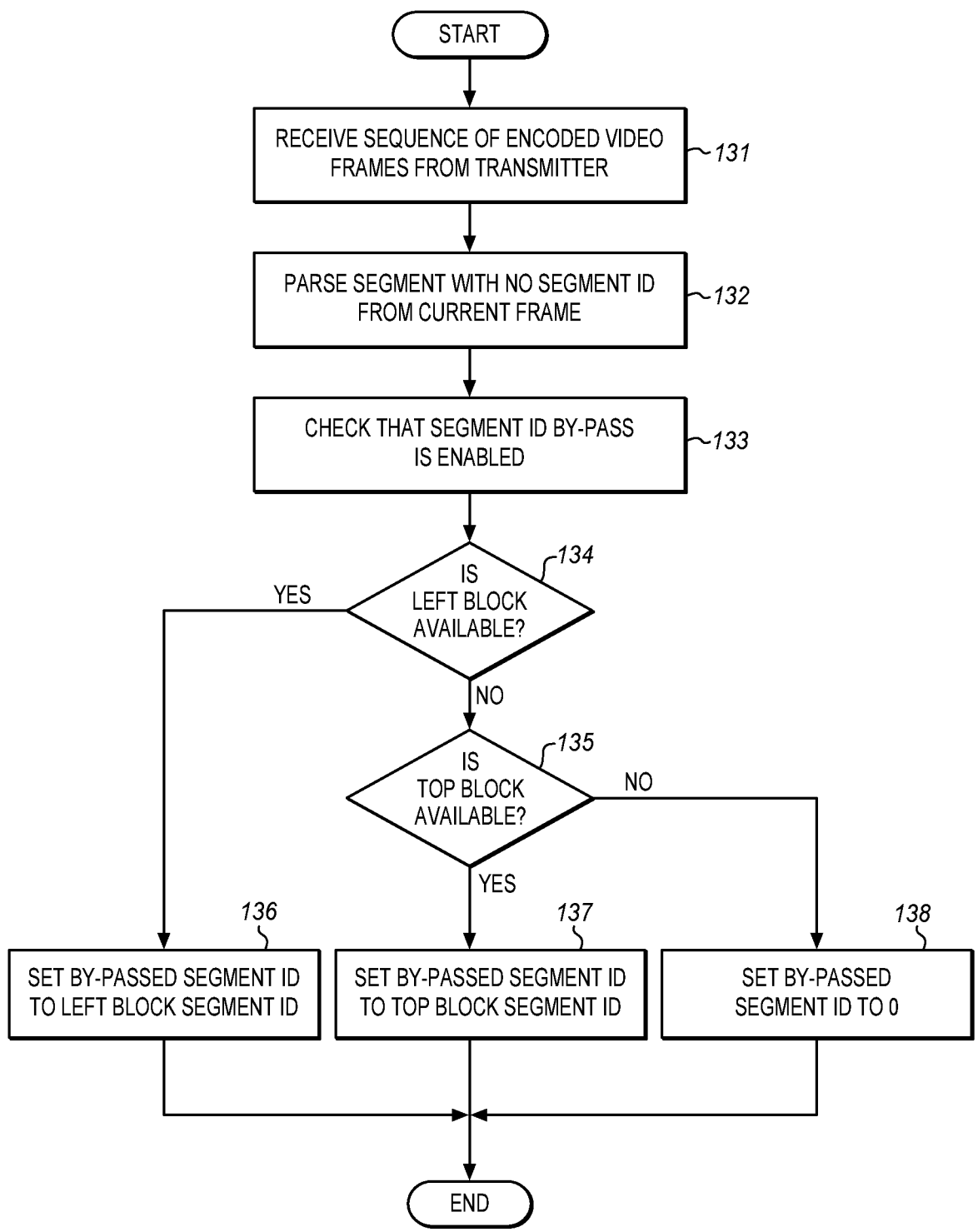
FIG. 7 is a process flow diagram of recovering a segment id in a decoder according to an embodiment.

The segment id of the skipped blocks within the minimum segment id unit may be recovered using the rules as set forth below. FIG. 7 is a process flow diagram of recovering the segment id at a decoder.

If temporal update is enabled, the segment id is set to the temporal predicted segment id. Otherwise, if temporal update is not enabled, then if the left block is available, segment id is set to the segment id of the left block. If temporal update is not enabled and the left block is not available and if the above block is available, then the segment id is set to the segment id of the above block. If neither the left or above block is available, then the segment id of the current block is set to 0.

This above process may be by-passed in some cases. If both the active segment and the quality segment are enabled, and the block has the active segment id referring to the SKIP feature, the quality segment id of this block will be by-passed.

This recovery of segment ids for skipped or by-passed blocks may be performed at a receiver or decoder that receives the encoded video sequence to decode and store or display. The receiver uses the recovered segment ids to decode each of the blocks of each frame. When the segment ids are bypassed there is no corresponding description of the features of the block. The decoder at 131 receives a sequence of encoded video frames from a transmitter in which some of the segment ids have been by-passed. At 132 the segments that have no segment id are parsed along with any other segments from the current frame. At 133 the decoder checks that segment id by-pass is enabled. If it is not enabled, and there is no segment id, then there may be an error.

If there is no error then at 134 the decoder determines if a segment id is available for the left block, i.e. a block to the immediate left of the by-passed block. If so, then the segment id for the left block is used as the segment id for the current by-passed block.

If the left block is not available then at 135 the decoder determines whether a top block is available. This is the block immediately above the by-passed block. The relative positions referred to herein refer to relative positions on a segmentation map of the current frame. The terms top and left refer to a way in which blocks are identified and coded in the segmentation map with scans in rows from left to right and top to bottom. Other encoding schemes may use a different map and block order in which case the first block to consider may be a lower block, diagonal block or some other block. In addition, a different standard may be used to determine which blocks are to the left of or above the current block. If the left block is not available, but the top block is available then the segment id is set to the top block segment id. If neither block segment id is available then the segment id may be set to some other value such as zero at 138.

To take into account the case where the segmentation map is signaled once (i.e. the segmentation map is in a key frame or a golden frame) and where subsequent frames do not update the segmentation map (e.g. seg_map_update is equal to 0), the quality segment id may be included in all cases. This allows a correct segment id to be used for the subsequent frames. A flag, e.g. quality_seg_id_by_pass_disabled, may be signaled in the uncompressed header to enable and disable the quality segment id by-pass function discussed above. Such a flag, e.g. quality_seg_id_by_pass_disabled, may be used to indicate either that the quality segment id by-pass is disabled or that the segment id is explicitly coded (using temporal, spatial prediction if possible), or that the by-pass is enabled.

In the existing VP9 specification, the coded video is sent as a sequence of frames. Each frame has an uncompressed header that contains most of the frame level information. The uncompressed header is followed by a compressed header that specifies transform sizes and other information. The uncompressed header is followed by information for tiles of the frame in a specified order. The tiles may be different sizes and may be different in size from blocks and segments.

Multiple compressed video frames may be combined into one single chunk called a superframe. The superframes have an index to allow each of the frames in the superframe to be located and parsed. This allows multiple frames to be transmitted and received as a single chunk or container.

Efficiency may be enhanced further by adapting the granularity of the segment id coding. In the existing VP9 specification, the segment id is always coded at a minimum 8×8 block level even though all the 8×8 blocks within a larger block (e.g. 32×32) are actually sharing the same segment id. Instead, a configurable segment id coding unit may be used for both active and quality segments. That is, in the compressed header, four bits (2-bit active_seg_min_unit_size_log 2_minus3 and 2-bit quality_seg_min_unit_size_log 2_minus3) may be used to signal the minimum segment id unit size (i.e. 0: 8×8, 1: 16×16, 2: 32×32, 3: 64×64 for each type of segment). All blocks within the minimum segment id coding unit may share the same segment id. With this change, the segment id is no longer required for each block. The segment id is only needed to be signaled at the minimum segment id unit.

Figure 8:
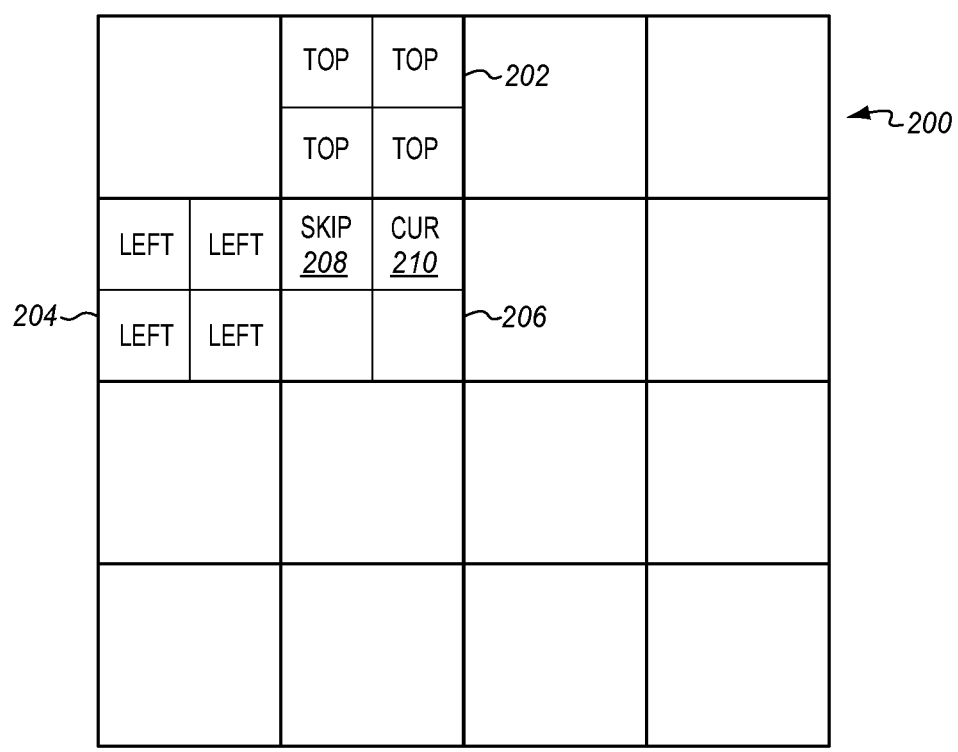
FIG. 8 is a diagram of a portion of a frame apportioned into multiple blocks for segment id coding according to an embodiment.

In some embodiments, the left block and top block derivation for segment context is always aligned with the minimum segment unit. For example, when the minimum segment id unit is 16×16, the left block and top block may be derived as shown in FIG. 8. It may be noted that the minimum segment id unit for an active segment may be different from the minimum segment id unit for a quality segment.

FIG. 8 is a diagram of a portion of a frame 200 which is apportioned into multiple equal size e.g. 8×8 or 16×16 blocks. These blocks may serve as a minimum segment unit. Groups of four blocks are combined into segments. This division of the frame may be provided by a segmentation map. The frame will be encoded from left to right and then from top to bottom, although this is not required. There is a current block 210 that is being encoded within a segment 206 that includes four blocks. The first block 208 in the segment is skipped or by-passed in this example as described above. The current block is in a process of being encoded. The neighbor blocks for reference and use by a segment id coding unit include a top segment 202 of top blocks and a left segment 204 of left blocks.

Figure 9:
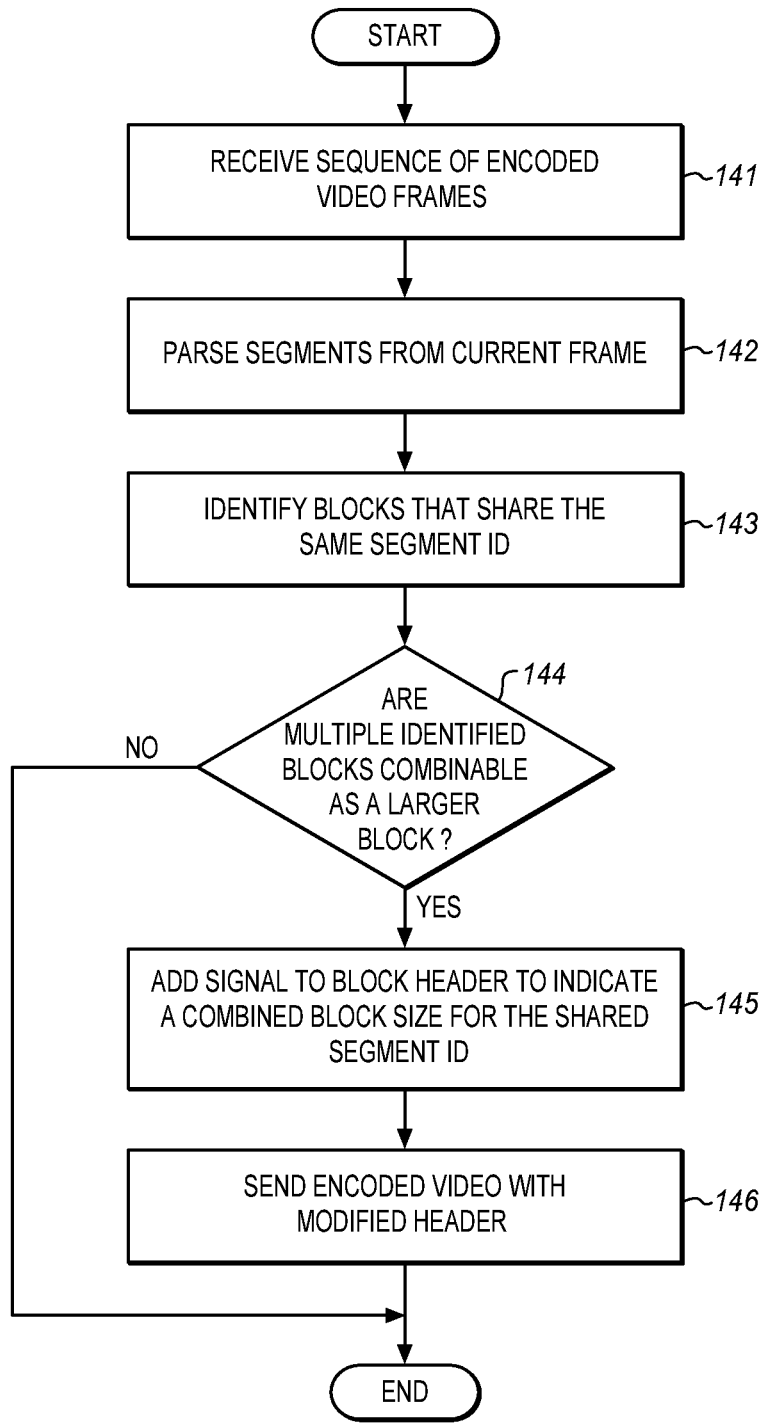
FIG. 9 is a process flow diagram of controlling segment id granularity according to an embodiment.

FIG. 9 is a process flow diagram of a controlling the block size for a single shared segment id. At 141 a sequence of encoded video frames is received at a minimum segment id unit or another analysis unit. At 142 the segments are parsed from the current frame. At 143 blocks are identified that share the same segment id value. These blocks are then tested to see whether they are combinable to reduce the granularity of the segment id.

At 144, the blocks are analyzed to find if there are multiple identified blocks that are combinable as a larger block. In the example of FIG. 8 the top blocks 202 and the left blocks 204 all have the same segment id. Accordingly, the group of 4 top blocks may be combined and the group of 4 left blocks may be combined. Each group of four blocks may be considered as being with a larger block that includes all four blocks. These four blocks may be combined to form a single segment. The top blocks cannot be combined with the left blocks because they are not contiguous and because they have a different segment id. If there are no such combinable groups, then this operation is skipped and the process ends.

At 145 a signal is added to the header of one of the blocks to indicate a combined block size for the shared segment id. This is then the size of the segment. As mentioned above, a set of bits may be used to indicate the size of the new block. This information may then be used to interpret the included segment id. The segment id is then not required for the other blocks that are combined into the same segment. This may be viewed as indicating a segment size for a segment id or as indicating a number of blocks in a particular segment. The signal is added to the header, for example, the compressed header for one of the block, for example, the first block. At 146 the encoded video is sent or stored with the modified header as a part of the encoded sequence of frames.

Efficiency may also be improved by combining signaling for delta qp and for loop filtering level. The delta qp signaling may be allowed to combine segment features with the delta qp signaling. Such a quantizer value computation process is described in detail below. The signaling may be summarized using the four points below.

Point 1) In the uncompressed frame header, the encoder or coder signals a delta_q_present_flag and a delta_q_res_log 2 (delta q resolution flag by log 2). The delta_q_present_flag (delta q present flag) indicates whether or not a delta_q_idx (delta q index) syntax element is present for each super-block. The delta_q_res_log 2 sets the resolution with which delta_q_idx is applied. The resolution is scaled, in units of delta_q_res=1<<delta_q_res_log 2. When the delta_q_present_flag equals 1 and the segmentation map is enabled, then the quantizer and loop filter level parameters are signaled in the segment as delta values rather than as absolute values.

Point 2) At the beginning of each superblock, if the delta_q_present_flag=1, then the coder will signal a delta_q_idx syntax element if the superblock is split into smaller blocks, or the superblock is not a skip block.

Point 3) For each superblock where the delta_q_idx syntax element is present, the current_q_idx may be calculated as follows: current_q_idx_prior_seg (current q index for the prior segment)=prev_q_idx_prior_seg+(previous q index for the prior segment) delta_q_idx (delta q index)* delta_q_res (delta q resolution).

If the quantizer feature is enabled in the seg map (segmentation map): current_q idx=current_q_idx_prior_seg+ delta_q_idx_in_seg.

If the quantizer feature is not enabled in the seg map (segmentation map): current_q_idx=current_q_idx_prior_seg, where prev_q_idx_prior_seg is equal to the value of current_q_idx_prior_seg in the previous superblock in scan order, and where prev_q_idx_prior_seg is initialized to base_q_idx (base q index) for the first superblock of each tile, delta_q_idx_in_seg is the delta q index of the segment indexed by the current block segment id.

Point 4) Use the current_q_idx instead of the base_q_idx (+delta_q_idx_in_seg if present) for dequantization. This includes adjusting the current_q_idx value with delta_q_y_dc, delta_q_uv_dc, and delta_q_uv_ac if present.

Note that, the lossless mode may be determined based on the base_q_idx and delta_q_idx_in_seg for each segment.

In this context, base_q_idx indicates the base frame q index. This is used for Y AC coefficients and as the base value for the other quantizers:

delta_q_y_dc indicates the Y DC quantizer relative to base_q_idx;

delta_q_uv_dc indicates the UV DC quantizer relative to base_q_idx;

delta_q_uv_ac indicates the UV AC quantizer relative to base_q_idx;

delta_coded specifies that the delta_q syntax element is present in the bitstream;

delta_q specifies an offset (relative to base_q_idx) for a particular quantization parameter.

Figure 10:
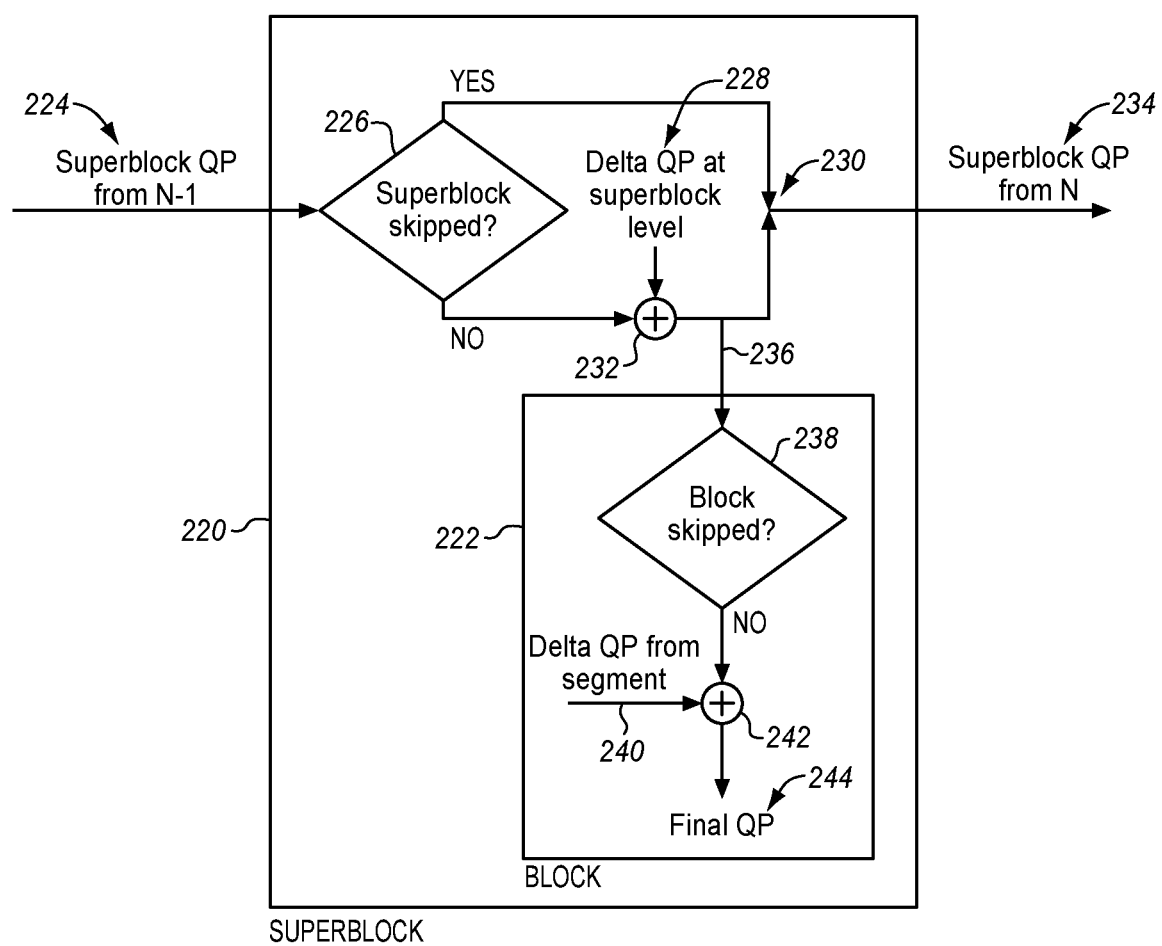
FIG. 10 is a process flow diagram of deriving quantization parameter signaling according to an embodiment.

FIG. 10 is a logical block diagram of deriving quantization parameter (qp) signaling for a superblock level delta qp and also for a segment-based delta qp. The illustrated operations may be performed in an encoder or dedicated hardware. As shown, there is a decision block that receives for a current (N) superblock 220 superblock qp from the previous (N−1) superblock 224. The superblock operations produce superblock qp for the current superblock, block N, as an output 234.

A delta_q_present_flag and a delta_q_res_log 2 are signaled in the uncompressed frame header for the current superblock in this output. As mentioned, the delta_q_present_flag indicates whether or not a delta_q_idx syntax element is present for each superblock. The delta_q_res_log 2 (delta quantization resolution factored at log 2) sets the resolution with which a delta_q_idx (delta q index) is applied scaled, in units of delta_q_res=1<<delta_q_res_log 2.

Within the superblock 220, the delta q present flag is parsed and if delta_q_present_flag equals 1 and if the segmentation map is enabled, then the quantizer and loop filter level, then at 226, the superblock is not skipped and the parameters may be signaled in the segment as delta values 228 rather than as absolute values. The values are added to the signal at 232. This results in significant savings in the amount of data that is to be transmitted. Otherwise the NO branch is taken from 226 and the data travels to a junction 230 where it is sent unmodified with the QP data for superblock N at 234 being the same as for superblock N−1.

If the delta_q_present_flag=1, then the decision box 226 analyzes the blocks 222 within the superblock. The decision box determines that the superblock is not a skip superblock and then a second decision box 238 determines whether the block is a skipped block at 238. If both conditions are true then a yes result leads to the delta QP from the segment being added to the final QP (quantization parameter) for the block. If not, then the previous block QP is used based on the NO branch from decision block 238.

Stated another way, if the superblock is not skipped, the super level qp is updated by adding the delta qp at the superblock level into the QP from previous superblock, which produces the output qp 234 for the current superblock. The process 222 of generating the QP for each block inside the current superblock is described as follows.

A decision box 238 decides if the block is skipped or not. If the block is skipped, there is no qp output for this block. The previous output may be repeated or the syntax element is simply not included. If the block is not skipped at 238, then the block qp is generated in 242 by adding the delta qp in 240 associated with the segment id into the superblock level qp, which produces the output qp 244 for the current block.

Figure 11:
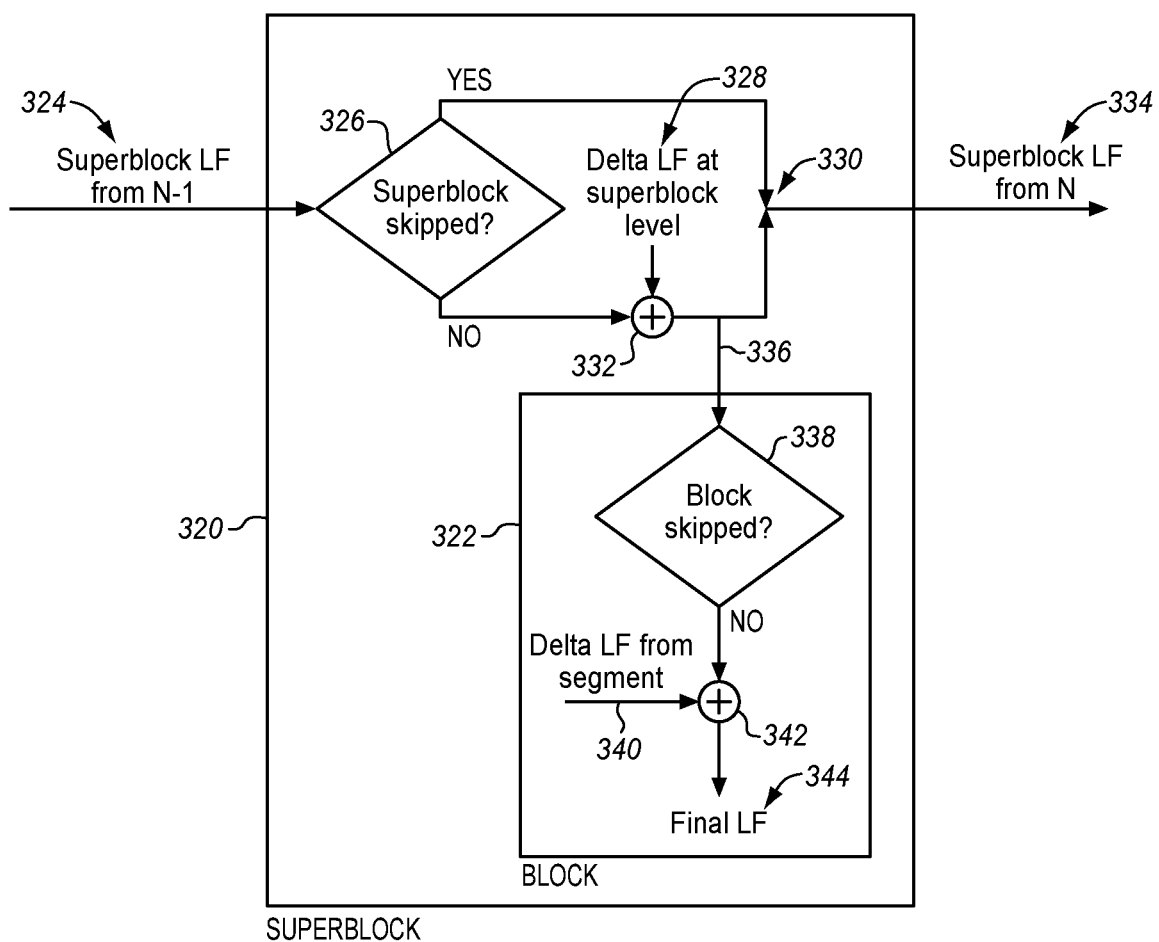
FIG. 11 is a process flow diagram of deriving loop filter signaling according to an embodiment.

Delta loop filtering level signaling may be allowed to combine segment features with the delta loop filtering signaling. Such a loop filtering level computation process is described in detail below. The signaling may be summarized using the four points below and as shown in FIG. 11. FIG. 11 is a logical block diagram of deriving loop filter signaling for a superblock level and also for a segment.

In the uncompressed frame header, when the delta_q_present_flag is equals 1, the codec signals a delta_lf_present_ flag (delta loop filter present flag) and a delta_lf_res_log 2 (delta loop filter resolution factored by log 2). The delta_lf_ present_flag indicates whether or not a delta_lf_level syntax element is present for each superblock. The delta_lf_res_log 2 sets the resolution with which delta_lf_level is applied. This resolution is scaled in units of delta_lf_res=1<<delta_lf_res_log 2. When the delta_q_present_flag is equal to 1 and the segmentation map is enabled, then the segment feature data (for the quantizer and for the loop filter level features) may be sent in a delta value format instead of in an absolute value format. When the delta_lf_present_flag is not present, then it may be inferred to be 0.

At the beginning of each superblock, if the delta_lf_present_flag 32 1, a delta_lf_level (delta loop filter level) syntax element is signaled if:
the superblock is split into smaller blocks, or
the super block is not a skip block.

For each superblock where the delta_lf_level is present, the current_lf_level may be calculated as follows: current_lf_level_prior_seg (current loop filter level for the prior segment)=prev_lf_level_prior_seg (previous loop filter level for the prior segment)+delta_lf_level_*delta_lf_res.

If the loop filter level feature is enabled in the segmentation map then: current_lf_level=current_lf_level_prior_seg+delta_lf_level_in_seg.

If the loop filter level feature is not enabled in the segmentation map then: current_lf_level=current_lf_level_prior_seg, where prev_lf_level_prior_seg is equal to the value of current_lf_level_prior_seg in the previous superblock in scan order, and where prev_lf_level_prior_seg is initialized to base_lf_level for the first superblock of each tile, delta_lf_level_in_seg is the delta lf level of the segment indexed by the current block segment id.

Use the current_lf_level instead of the base_lf_level (+delta_lf_level_in_seg if present) for the loop filter for each block. This includes adjusting the current_lf_level value with delta_ref_lf_level, delta_mode_lf_value if present.

As shown in FIG. 11, a superblock loop filter 324 is received for a previous superblock 320. Within the superblock 320, the delta_lf_present flag is parsed and if the delta_lf_present_flag equals 1 and if the segmentation map is enabled, then the superblock at 326 is not skipped. The loop filter level parameters may be signaled in the segment as delta values rather than as absolute values. This results in significant savings in the amount of data that is to be transmitted.

If the delta_lf_present_flag=1, then a decision box 326 analyzes the blocks 322 within the superblock. The decision box determines if the superblock is not a skip block. If either condition is true then a yes result leads to a junction 330 and the superblock LF (loop filter) from the previous superblock 324 is produced as the output LF 334 for the current superblock.

If the superblock is not skipped, then the super level LF is updated 332 by adding the delta LF 328 at the superblock level into the LF 324 from the previous superblock, which produces the output LF 334 for the current superblock.

For each block 322 the loop filter is also generated for each block as shown. A decision box 338 decides if the block is skipped or not for each block. If the block is skipped, then there is no LF output for this block, the prior loop filter values are used as the final loop filter output 344. If the block is not skipped, then the block LF is generated in 342 by adding the delta LF 340 associated with the segment id into the superblock level LF, which produces the output LF 344 for the current block. This is combined into the output for the superblock as in FIG. 10.

The signaling for FIGS. 10 and 11 may be combined within the uncompressed header. This allows the savings from delta qp signaling and the savings from delta loop filter signaling to be combined for an even more efficient codec.

Figure 12:
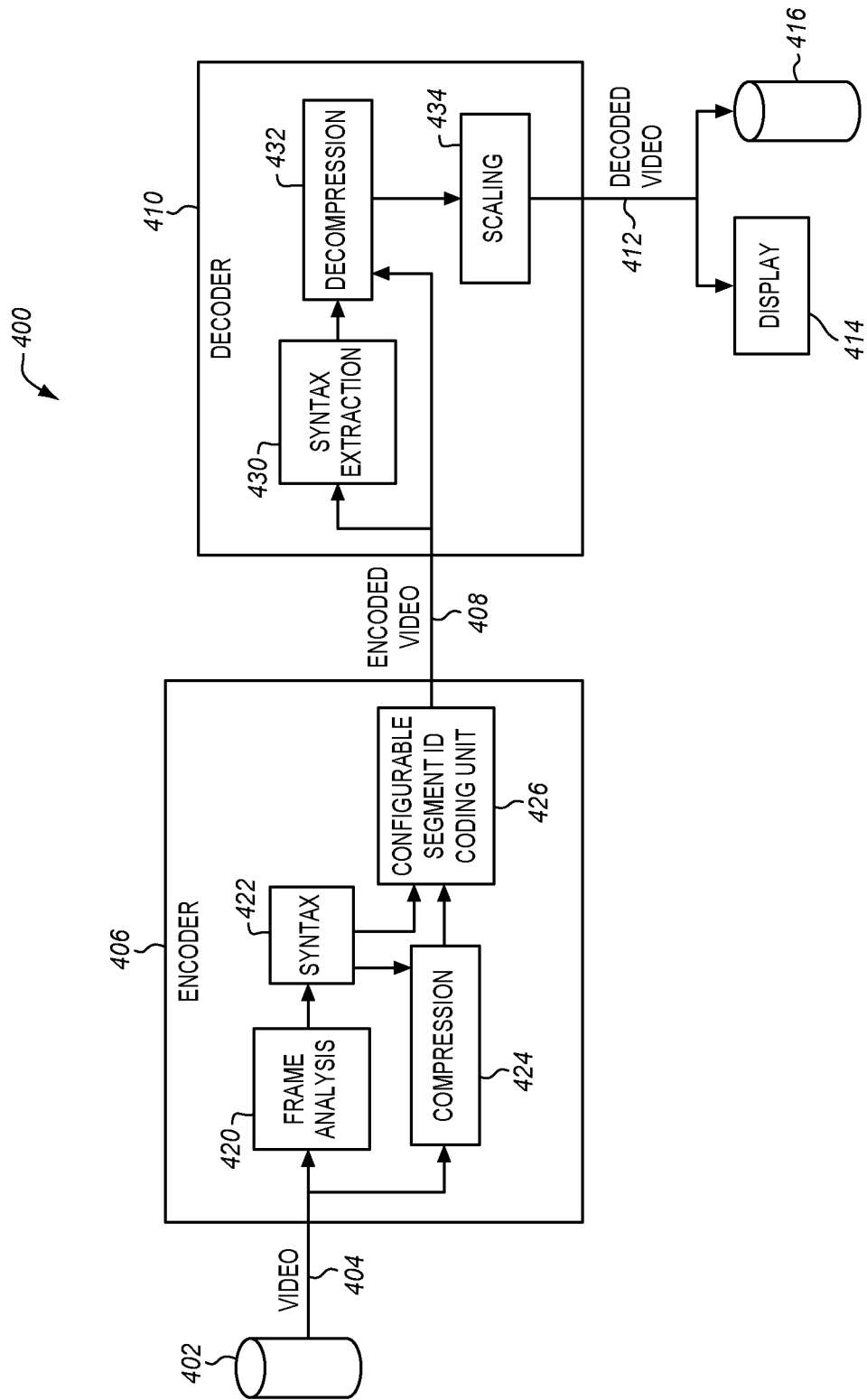
FIG. 12 is a block diagram of a panoramic video coding system according to an embodiment.

FIG. 12 is a block diagram of a panoramic video coding system 400. Video is produced at a server, production system or a combination of different systems. The video is stored at a mass storage 402 and received from the mass storage or from a remote transmitter or from a camera or in any other suitable way. The received video is input to a video encoder 406, such as HEVC, AVC, Av1, VP9 or other suitable encoder. The encoder encodes the video and sends or buffers it as encoded video 408 for later transmission or storage as a bitstream. The buffer may be a part of the encoder or of another component.

The encoded video is sent as a bitstream through a network, Internet, broadcast, or point-to-point connection, from the encoder to a decoder 410. The encoder may be a server or head end sending to one or more clients as decoder or any other transmission or communication configuration may be used. At the client, a video decoder 410 receives the video from the server and decodes the compressed bitstream. The decoder 410 decodes the video and provides a suitable video stream as decoded video 412 to a display 414 or for storage in a mass storage device 416 or both. The display allows the viewport to be viewed on a normal 2D or 3D display depending on the nature of the video.

The encoder 406 analyzes the received frames of the video in a frame analysis module 420. This module produces individual parsed frames for compression in a compression module 424 and it produces syntax 422 to characterize the features of the frames as described herein. The compressed frames are combined with the syntax in the resulting encoded video 408. The encoder may also include a configurable segment id coding unit 426 to classify segments, by-pass segment id coding, change the segment id coding granularity, combine delta qp signaling and loop filter signaling for superblocks and perform other functions to further improve the efficiency of the bitstream and the quality of the resulting video at the display 414.

The decoder includes a syntax extraction module 430 to analyze the encoded video and extract frames and syntax for the frames. These are provided to a decompression module 432 that uses the syntax to decompress and render all of the original frames. These frames are then provided to a scaling module 434 and any other suitable rendering modules (not shown) to generate the decoded video 412 for display and storage.

Figure 13:
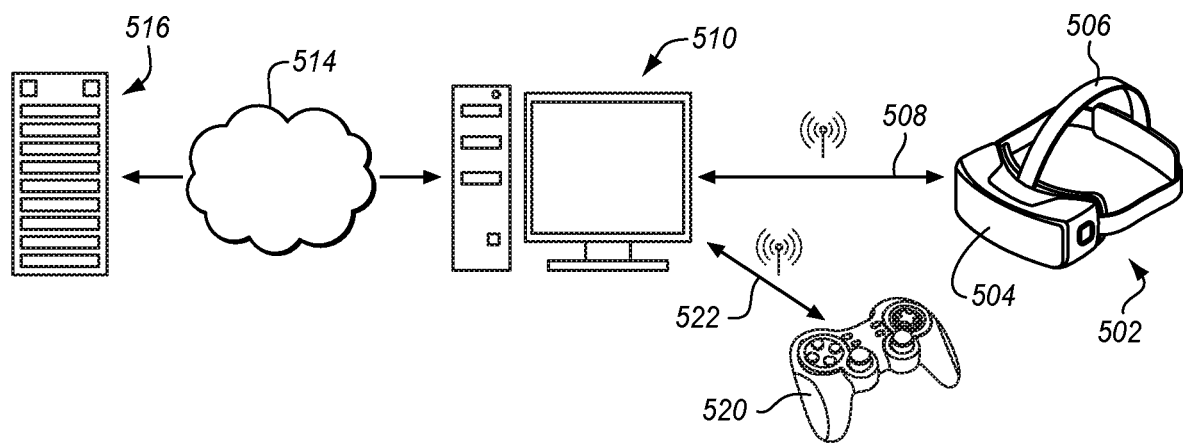
FIG. 13 is a block diagram of a head mounted display with connected computing resources suitable for embodiments.

FIG. 13 is a diagram of high performance HMD (Head Mounted Display) with multiple remote information sources. An HMD 502 has a main body 504 and an attachment strap 506. The main body carries user displays and speakers to render the virtual world to the wearer. The main body also has inertial sensors, a microphone and other user input devices. A processing, communications, and power or battery suite allow the HMD to render video and sound and to communicate wirelessly 508 with a tethered computer 510. Alternatively, the HMD may be replaced with a monitor, projector or any other suitable display and associated components.

The user interacts with the display through head and body movements and may also interact using voice commands, hand gestures and other user input devices. A game controller 520 may be coupled to the tethered computer through the same 508 or another 522 wireless interface to provide additional controls. The HMD may be coupled to the computer through a WiFi, a WiDi, or another high speed digital wireless connection to receive rendered or compressed video frames and audio from the computer for display to the user. Additional descriptions, data, parameters, and commands may also be received from the computer. The HMD may also send command, control, and interaction data to the computer through the same or another wireless link. The controller, for example may communicate through Bluetooth or unlicensed bands. Multiple wireless interfaces may be combined to provide the complete user experience.

In some cases, the computer is portable and carried by the user. This allows for a wired connection, if desired. The carried computer may have a notebook, tablet, smartphone, or any other desired physical configuration. In other cases, the computer is fixed and is attached to the HMD using a wired connection.

The computer may in turn be connected through the Internet, a LAN (Local Area Network) or other connection 514, wired or wireless, to a remote server 516. The remote server provides encoded video and may provide additional information about the transmitted video. The remote server may also provide communication with other users that are experiencing the same or a related video. Alternatively, the HMD may communicate directly with the server without going through the computer 510. In other embodiments, no remote server is used and the tethered computer operates independently.

In the examples herein, a wireless HMD has a local computing resource or client device, such as a CPU (Central Processing Unit) that may be coupled to a GPU (Graphics Processing Unit), graphics processor, memory and other resources to allow the HMD to store and render received encoded video. The local rendering may include rotation and viewport generating as described, among other tasks. The encoder may be in the server 516, the tethered computer 510 or both. Similarly a decoder may be in the tethered computer 510, the HMD 502 or both.

Figure 14:
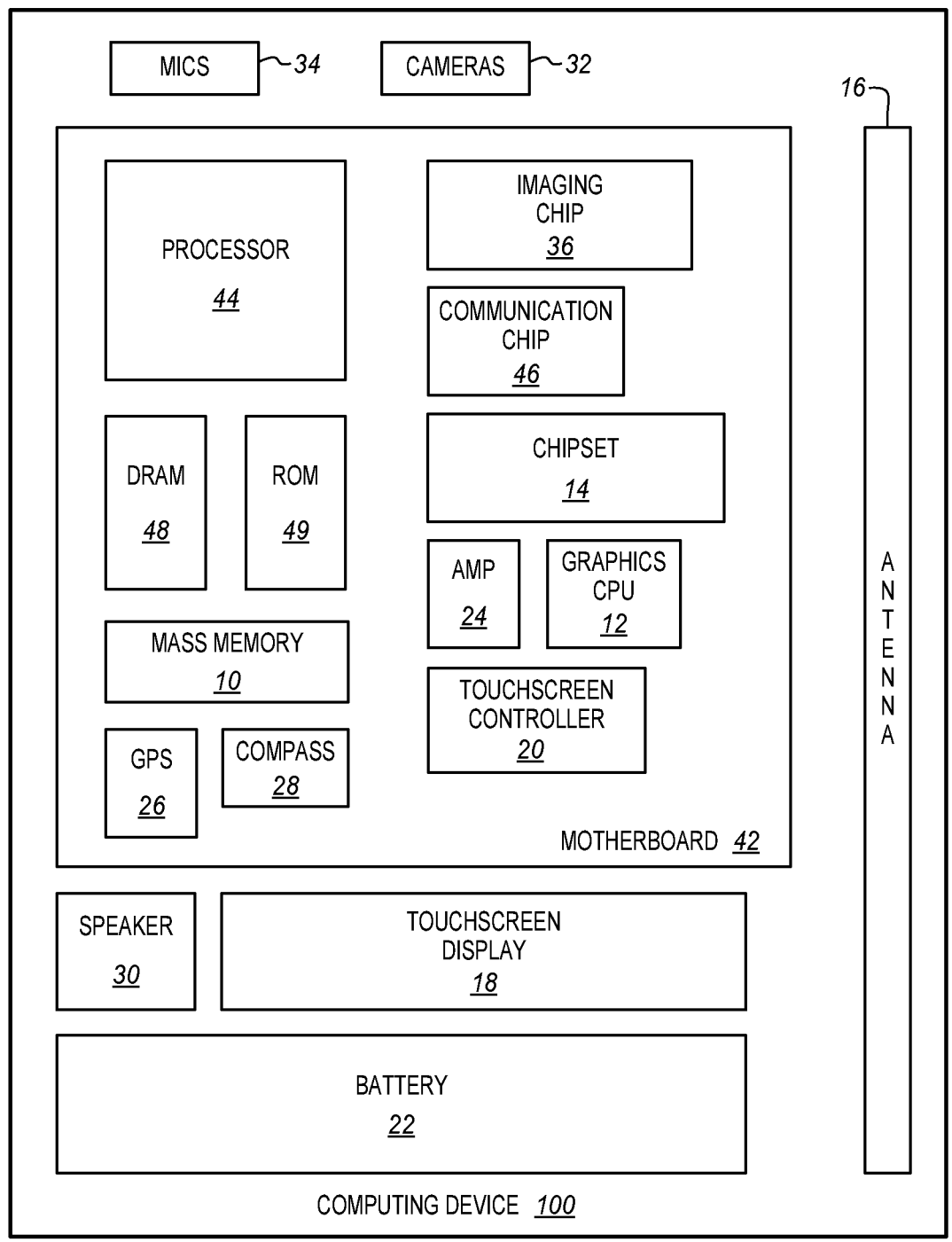
FIG. 14 is a block diagram of a computing device suitable for video capture, encoding, decoding, and display according to an embodiment.

FIG. 14 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a lamp 33, a microphone array 34, and a mass storage device (such as a hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 capture video as a sequence of frames as described herein. The image sensors may use the resources of an image processing chip 3 to read values and also to perform exposure control, shutter modulation, format conversion, coding and decoding, noise reduction and 3D mapping, etc. The processor 4 is coupled to the image processing chip and the graphics CPU 12 is optionally coupled to the processor to perform some or all of the process described herein for the video encoding. Similarly, the video playback and decoding may use a similar architecture with a processor and optional graphics CPU to render encoded video from the memory, received through the communications chip or both.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims. The various features of the different embodiments may be variously combined with some features included and others excluded to suit a variety of different applications.

Some embodiments pertain to a method that includes receiving video frames, generating a segmentation map of a received video frame, determining features of a segment of the segmentation map, determining if the segment has a skip or a reference frame feature, and if the segment has one of a skip or a reference frame feature, then classifying the segment as an active segment and attaching an active segment identifier to the segment.

Further embodiments include determining if the segment has an alternative quantization feature or an alternative loop filter feature, and if the segment has one of an alternative quantization feature or an alternative loop filter feature, then classifying the segment as a quality segment and attaching a quality segment identifier to the segment.

Further embodiments include transmitting the frame including the segment with the associated active segment identifier.

In further embodiments a skip feature indicates that there is no motion in the segment.

Further embodiments include determining if the segment is a quality segment, and is a quality segment, then if the segment as an alternative loop filter feature and no skip feature, then by-passing the segment id for the segment.

Further embodiments include determining if the segment is a quality segment, and is a quality segment, then if the segment has a skip feature, then by-passing the segment id for the segment.

Further embodiments include determining whether segment id by-pass is enabled for the segment in the video using a flag and if not, then not by-passing the segment id.

Some embodiments pertain to means for practicing any one of the recited methods.

Some embodiments pertain to machine readable media for practicing any one of the recited methods.

Some embodiments pertain to an apparatus including a codec for practicing any one of the recited methods.

Some embodiments pertain to a method that includes receiving video frames wherein at least one frame is an intra coded video frame, generating a segmentation map of the received intra coded video frame, determining features of a segment of the segmentation map, and deriving a spatial context of the segment to one if, for the segment there is in the segmentation map a left block and a top block with respect to the segment and if the segment id of the left block equals the segment id of the top block.

Further embodiments include deriving the spatial context of the segment to zero if there is no left block and top block with respect to the segment for which the segment id of the left block equals the segment id of the top block.

Some embodiments pertain to a method that includes receiving video frames, generating a segmentation map of a received video frame, generating segment ids for blocks of segments of the segmentation map, identifying blocks that share a same segment id, determining blocks that share a same segment id that are combinable as a larger block, combining the blocks to form a combined block, and adding a signal to a header of the frame to indicate a size of the combined block that shares the same segment id.

Some embodiments pertain to a method that includes receiving video frames at a codec, compressing the frames into a superblock and blocks, and signaling the presence of a delta quantization syntax element and a resolution quantization element in a header of a superblock, wherein the delta quantization syntax element is in the form of delta values for a segment and not as absolute quantization values for the superblock.

Further embodiments include signaling a delta quantization index when the superblock is split into smaller blocks for purposes of determining quantization.

In further embodiments the delta quantization index is determined by adding delta quantization index values to a quantization index of a prior segment.

Some embodiments pertain to a method that includes receiving video frames at a codec, compressing the frames into a superblock and blocks, and signaling the presence of a delta loop filter syntax element and a resolution loop filter element in a header of a superblock, wherein the delta loop filter syntax element is in the form of delta values for a segment and not as absolute loop filter values for the superblock.

In further embodiments the delta loop filter values are determined as a difference from a loop filter value for a previous superblock.

In further embodiments a video frame comprises blocks in a segmentation map, the method further comprising signaling a delta loop filter a block of a video frame.

Further embodiments include signaling the presence of a delta quantization syntax element and a resolution quantization element in a header of a superblock, wherein the delta quantization syntax element is in the form of delta values for a segment and not as absolute quantization values for the superblock.

What is claimed is:

1. A method comprising:
   receiving video frames;
   generating a segmentation map of a received video frame and having at least one segment wherein each segment is assigned at least one block of pixel image data;
   generating an active segment identifier of the at least one segment when the at least one segment has a skip feature or a reference frame feature;
   generating a quality segment identifier of the at last one segment when the at least one segment has an alternative loop filter feature or an alternative quantization feature;
   coding and transmitting the active segment identifier; and
   bypassing the encoding and transmission of the quality segment identifier comprising omitting the coding and transmission of the quality segment identifier at least partly depending on features of the segment.

2. The method of claim 1, further comprising bypassing the coding and transmission of the quality segment identifier when the at least one segment has the alternative loop filter feature enabled and the skip feature is not enabled.

3. The method of claim 1, further comprising bypassing the coding and transmission of the quality segment identifier when the at least one segment has the skip feature enabled.

4. The method of claim 1, further comprising bypassing the coding and transmission of the quality segment identifier only when a segment id bypass is enabled for the at least one segment using a flag.

5. The method of claim 1 wherein at least one frame is an intra coded video frame; and the method further comprising:
   deriving a spatial context of the at least one segment when the segmentation map has a left block and a top block with respect to a block that forms the at least one segment, wherein the left block and the top block have the same segment id.

6. The method of claim 1 further comprising:
   generating segment ids for blocks of segments of the segmentation map;
   determining blocks that share a same segment id that are combinable as a larger block;
   combining the blocks that share the same segment id to form a combined block;
   adding a signal to a header of the frame to indicate a size of the combined block; and
   assigning the same segment id to the combined block.

7. The method of claim 1 further comprising:
   compressing the frames into a superblock and blocks; and
   signaling the presence of a delta quantization syntax element and a resolution quantization element in a header of the superblock, wherein the delta quantization syntax element is in the form of delta values for the at least one segment and not as absolute quantization values for the superblock.

8. The method of claim 7, further comprising signaling a delta quantization index when the superblock is split into smaller blocks for purposes of determining quantization.

9. The method of claim 7, wherein a delta quantization index is determined by adding delta quantization index values to a quantization index of a prior segment.

10. The method of claim 1 further comprising:
    compressing the video frames into a superblock and blocks; and
    signaling the presence of a delta loop filter syntax element and a resolution loop filter element in a header of the superblock, wherein the delta loop filter syntax element is in the form of delta values for the at least one segment and not as absolute loop filter values for the superblock.

11. The method of claim 10, wherein the delta loop filter syntax element delta values are determined as a difference from a loop filter value for a previous superblock.

12. The method of claim 10, wherein a video frame comprises blocks in the segmentation map, the method further comprising signaling a delta loop filter of a block of a video frame.

13. The method of claim 10, further comprising signaling the presence of the delta quantization syntax element and a resolution quantization element in the header of the superblock, wherein the delta quantization syntax element is in the form of delta values for the at least one segment and not as absolute quantization values for the superblock.

14. The method of claim 1 wherein the bypassing comprises bypassing the coding and transmission of the quality segment identifier at least partly depending on enablement of at least one of the features.

15. The method of claim 1 wherein the bypassing comprises bypassing the coding and transmission of the quality segment identifier while the alternative loop filter feature or the alternative quantization feature or both is enabled.

16. An apparatus comprising at least one processor arranged to operate by:
  receiving video frames;
  generating a segmentation map of a received video frame and having at least one segment wherein each segment is assigned at least one block of pixel image data;
  generating an active segment identifier of the at least one segment when the at least one segment has a skip feature or a reference frame feature;
  generating a quality segment identifier of the at last one segment when the at least one segment has an alternative loop filter feature or an alternative quantization feature;
  coding and transmitting the active segment identifier; and
  bypassing the encoding and transmission of the quality segment identifier comprising omitting the coding and transmission of the quality segment identifier at least partly depending on features of the segment.

17. The apparatus of claim 16 wherein the bypassing comprises bypassing the coding and transmission of the quality segment identifier at least partly depending on whether the at least one block is intra coded or inter coded.

18. The apparatus of claim 16 wherein the processor is arranged to operate by assigning multiple blocks to a single segment that each have the same segment identifiers, and
  coding and transmitting the active segment identifier or quality segment identifier or both segment identifiers only of one of the multiple blocks of the single segment.

19. A non-transitory machine readable medium causing a computing device to operate by:
  receiving video frames;
  generating a segmentation map of a received video frame and having at least one segment wherein each segment is assigned at least one block of pixel image data;
  generating an active segment identifier of the at least one segment when the at least one segment has a skip feature or a reference frame feature;
  generating a quality segment identifier of the at last one segment when the at least one segment has an alternative loop filter feature or an alternative quantization feature;
  coding and transmitting the active segment identifier; and
  bypassing the encoding and transmission of the quality segment identifier comprising omitting the coding and transmission of the quality segment identifier at least partly depending on features of the segment.

20. The medium of claim 19 wherein a maximum permissible number of active segments each with the active segment identifier is different than the maximum permissible number of quality segments each with the quality segment identifier.

21. The medium of claim 19 wherein a maximum permissible number of active segments each with the active segment identifier is different than the minimum permissible block size of quality segments each with the quality segment identifier.

22. The medium of claim 19 wherein the bypassing is performed when a block in the at least one segment is at least one of:
  (a) intra coded, has the alternative loop filter feature enabled, and does not have the skip feature enabled,
  (b) inter coded and has the skip feature enabled.

* * * * *